(No Model.)  H. D. & D. W. SWIFT.  9 Sheets—Sheet 1.
ENVELOPE MACHINE.

No. 542,353. Patented July 9, 1895.

Fig. 1.

Witnesses:
Arthur H. Boswell.
Rufus B. Fowler.

Inventors:
Henry D. Swift
D. Wheeler Swift (No Model.)

H. D. & D. W. SWIFT.
ENVELOPE MACHINE.

No. 542,353.

Patented July 9, 1895.

Fig. 3.

Witnesses
Arthur H. Boswell.
Rufus B. Fowler

Inventors
Henry D. Swift
D. Wheeler Swift

Fig. 5.

(No Model.) 9 Sheets—Sheet 7.

H. D. & D. W. SWIFT.
ENVELOPE MACHINE.

No. 542,353. Patented July 9, 1895.

Witnesses:
Arthur H. Boswell.
Rufus B. Fowler

Inventors:
Harry D. Swift
D. Wheeler Swift (No Model.)  9 Sheets—Sheet 9.

H. D. & D. W. SWIFT.
ENVELOPE MACHINE.

No. 542,353.  Patented July 9, 1895.

WITNESSES.
Arthur H. Boswell.
Rufus B. Fowler

INVENTORS.
Henry D. Swift
D. Wheeler Swift

UNITED STATES PATENT OFFICE.

HENRY D. SWIFT AND DANIEL WHEELER SWIFT, OF WORCESTER, MASSACHUSETTS, ASSIGNORS, BY DIRECT AND MESNE ASSIGNMENTS, TO THE LOGAN, SWIFT & BRIGHAM ENVELOPE COMPANY, OF SAME PLACE.

ENVELOPE-MACHINE.

SPECIFICATION forming part of Letters Patent No. 542,353, dated July 9, 1895.

Application filed April 23, 1886. Serial No. 199,954. (No model.)

*To all whom it may concern:*

Be it known that we, HENRY D. SWIFT and DANIEL WHEELER SWIFT, citizens of the United States, residing at Worcester, in the county of Worcester and State of Massachusetts, have invented certain new and useful Improvements in Envelope-Machines, of which the following is a specification, reference being had to the accompanying drawings, in which—

Our invention relates to those portions of an envelope-machine employed in feeding, gumming, folding, drying, bunching, and counting; and our invention consists, first, in providing means for feeding the blanks to the action of the pick-ups, whereby the pile of blanks is maintained at the proper vertical height, and as the blanks become exhausted the feeding motion shall cease and the feeding-table shall automatically fall to its lowest position to receive a new supply of blanks; second, in providing tapered and spring-actuated gages for bringing the pile of blanks in suitable position to be gummed by the pick-ups; third, in controlling the rotation of the gumming-roll so as to secure a rolling contact with the gum-box roll, and also to vary the surface in contact with the pick-ups, whereby we are able to distribute gum to the pick-ups as the gumming-roll moves both away from and toward the gum-box, which causes two envelopes to be gummed at each reciprocation of the gumming-roll; fourth, in the construction of the mechanism for gumming and picking up the blanks, as hereinafter described; fifth, in applying a spring-pressure to the face of the folder for folding the back flaps and in the construction of the same; sixth, in providing means for adjusting the movable edge of the bed on which the envelopes are folded, so as to regulate the pressure upon the edge of the envelope; seventh, in providing means by which the envelopes, after having been fed to the folding mechanism with their seal-flaps foremost, are turned so the back-flap edge may be brought foremost to the drier; eighth, in the several details of construction of the mechanism for delivering the envelopes from the folding to the drying mechanism, as hereinafter described; ninth, in providing an independent reciprocating conveyer to transfer the envelopes to and withdraw them from the drier; tenth, in providing a rotating drier with radial currents of air, which move from the center outward and beneath the seal-flaps; eleventh, in providing pockets to sustain the envelopes in a radial position in the drier and at the same time permit the free circulation of a radial air-blast; twelfth, in means for varying the radial air-blast; thirteenth, in the combination, with the bunching and counting mechanism, of a tripping-finger which is moved laterally by the passage of the envelope and brought within the action of operating mechanism which withdraws it from contact with and carries it out of the path of the envelope; fourteenth, in interposing in the path of certain of the envelopes to be bunched a body with an oblique edge or surface by whose contact the envelope is slid endwise as it rests on its edge; fifteenth, in the arrangement and combination, in an envelope-machine, of the operating parts by which the envelopes are gummed, folded, and dried, whereby the blanks are presented with their seal-flaps foremost, and the envelopes are entered in the drier with their back flaps foremost and withdrawn from the drier and presented to the bunching mechanism with their seal-flaps downward and rearward; sixteenth, in providing means by which the operation of transferring the envelopes from the folder to the drier may be observed by the attendant from a position in front of the machine; seventeenth, in providing stopping mechanism by which the incomplete delivery of envelopes to the drier checks the operation of the machine; eighteenth, and our invention also further consists in certain details of construction and arrangement by which the successive operations of the machine are accomplished, as hereinafter described, and specifically pointed out in the claims.

Figure 5:
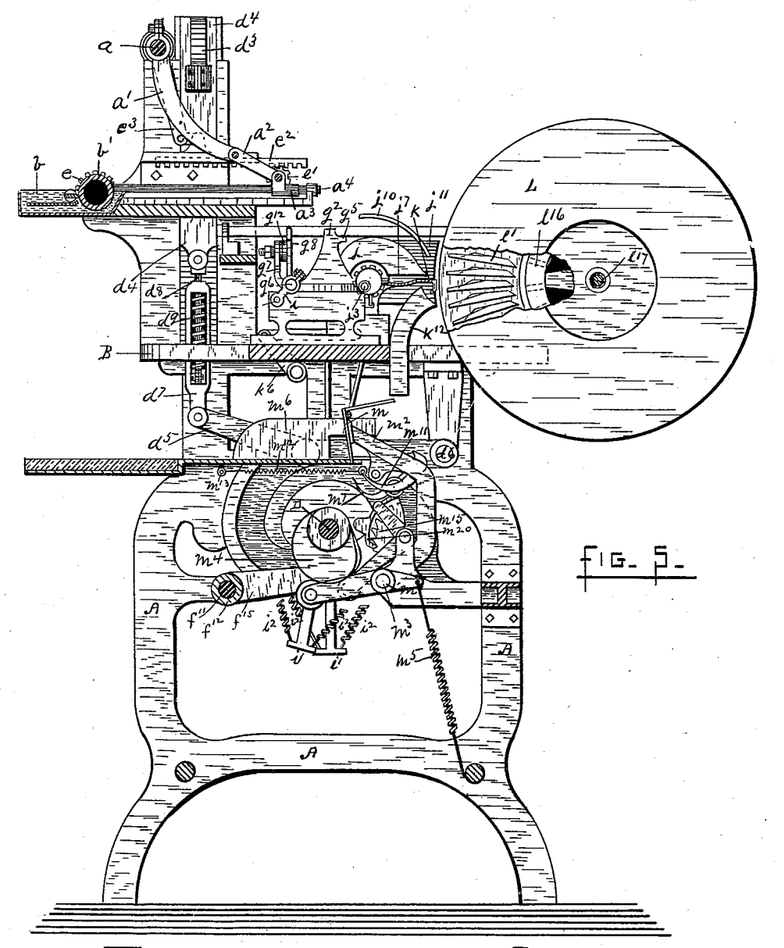
Fig. 5 is a sectional view through the central portion of the machine and with the pick-ups removed.

The framework of our machine consists of the sides A A, supporting the table B, upon which are the stands C C′, with bearings at their tops for the rocking shaft $a$, and between which is placed a shelf or table supporting the gum-box $b$, having a roll $b'$ rotated through the intermediate shaft $b^2$ and a system of bevel-gears by the main shaft D, which is journaled in bearings in the sides A A and extends transversely through the machine and is driven by the belt-pulley D′. On the opposite end of the main shaft the pinion $c$ engages a gear $c'$ of twice its size, running loosely on a fixed stud in the frame. Attached to the gear $c'$ are cams $c^2$ and $c^3$, Fig. 2, the cam $c^2$ actuating the rock-shaft $a$ through the crank-arm $c^4$ and connecting-rod $c^5$, which we attach to the lever $c^6$ pivoted to the frame at $c^7$ and carrying a cam-roll $c^8$. The cam $c^3$, through the connecting-rod $c^9$ and crank-arm $c^{10}$, oscillates the rack-actuating sleeve $c^{11}$ on the rocking shaft $a$. To the rock-shaft $a$ we attach arms $a'$, connected by links $a^2$ with the sleeves $a^3$, sliding on the rods or ways $a^4$ and which carry the bearings of the gumming-rolls $a^5$ and $a^6$, which are caused to traverse to and from the gum-box roll $b'$, the roll $a^5$ passing beneath and in contact with the back-flap gummer or pick-up $d$ and the seal-flap gummer or pick-up $d'$ and the roll $a^6$ beneath the side-flap gummer or pick-up $d^2$. The pick-ups $d$, $d'$, and $d^2$ are attached to and carried by the overhanging arm $d^3$ projecting from the slide $d^4$, sliding in V-shaped ways in the stand C with an intermittent vertical reciprocating motion, imparted by the lever $d^5$ pivoted at $d^6$, Fig. 5, and actuated by a suitably-formed cam on the main shaft D. We place a yielding connection between the lever $d^5$ and slide $d^4$, consisting of a link $d^7$ pivoted at its lower end to the lever $d^5$, a rod $d^8$ pivoted at its upper end to the slide $d^4$, and a spring $d^9$, whose tension acts to resist the sliding motion of the rod in the link, as illustrated in Fig. 5.

Figures 7, 8, 9, 10, 11, 12, 13:
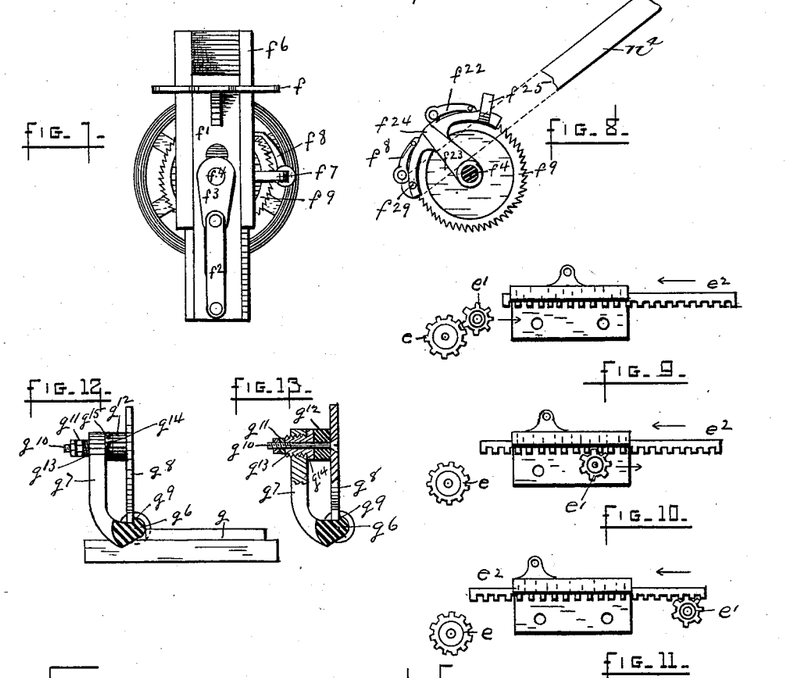
Figs. 7 and 8 show detached portions of the same.
Figs. 9, 10, and 11 show the relative positions of the sliding rack by which the surface of the gumming-roll presented to the pick-ups is varied.
Fig. 12 shows an elevation of the folder for folding the back flap of the envelope.
Fig. 13 is a sectional view of the same.

A gear $e$ is placed on the shaft of the gum-roll $b'$ and outside its bearings, and in alignment with it on the shaft of the gumming-rolls $a^5$ and $a^6$ is a gear $e'$, which engages the gear $e$ as the gumming-rolls are brought in contact, as shown in Fig. 9, and as the diameters of the rolls $b'$ and $a^5$ and $a^6$ equals that of the pitch-lines of gears $e$ and $e'$ the equal angular velocity and consequent rolling contact of the rolls is secured.

In ways attached to the stand C we place a sliding rack $e^2$ actuated by the oscillation of the sleeve $c^{11}$ through a link $e^4$ and an arm $e^3$ attached to the sleeve, and as the gumming-rolls are carried away from the gum-box roll $b'$ the gear $e'$ is made to engage with the rack $e^2$, securing a rolling contact of the gumming-roll $a^5$ with the under side of the back-flap gummer or pick-up $d$. As the gear $e'$ passes to the position of gumming the seal-flap gummer or pick-up $d'$, as shown in Fig. 10, the rack $e^2$ is moved, as indicated by the arrow, accelerating the rotation of the gumming-rolls for the purpose of bringing a portion of the surface of the gumming-roll $a^5$ in contact with the seal-flap gummer or pick-up $d'$, which was not previously brought in contact with the pick-up $d$. After the passage of the gumming-roll $a^5$ beneath the seal-flap gummer $d'$ the rack $e^2$ is moved still further in the same direction, the rack and gear assuming the position shown in Fig. 11. The reciprocating motion of the pick-up is then effected, gumming the first in the pile of blanks held on the table $f$, Figs. 2, 6, and 7. The motion of the gumming-roll is then reversed, passing beneath and gumming the pick-ups $d'$, $d$, and $d^2$, the rack $e^2$ being moved back as the roll $a^5$ passes between the pick-ups $d'$ and $d$, so as to bring a new surface in contact with the pick-up $d$, and as the gear $e'$ is disengaged from the rack a fourth motion of the rack brings it again to its first position, as shown in Fig. 9. The reciprocating motion of the pick-ups is again made and a second blank in the pile of blanks on the table $f$ is gummed.

It will be seen that two envelope-blanks are gummed by each complete reciprocation of the gumming-roll, the sliding motion of the rack $e^2$ being so timed as to present a new portion of the surface of the gumming-roll at each contact with a pick-up. The motion of the rack will depend of course upon the size of the gumming-roll and the distance it traverses between the pick-ups.

Figure 2:
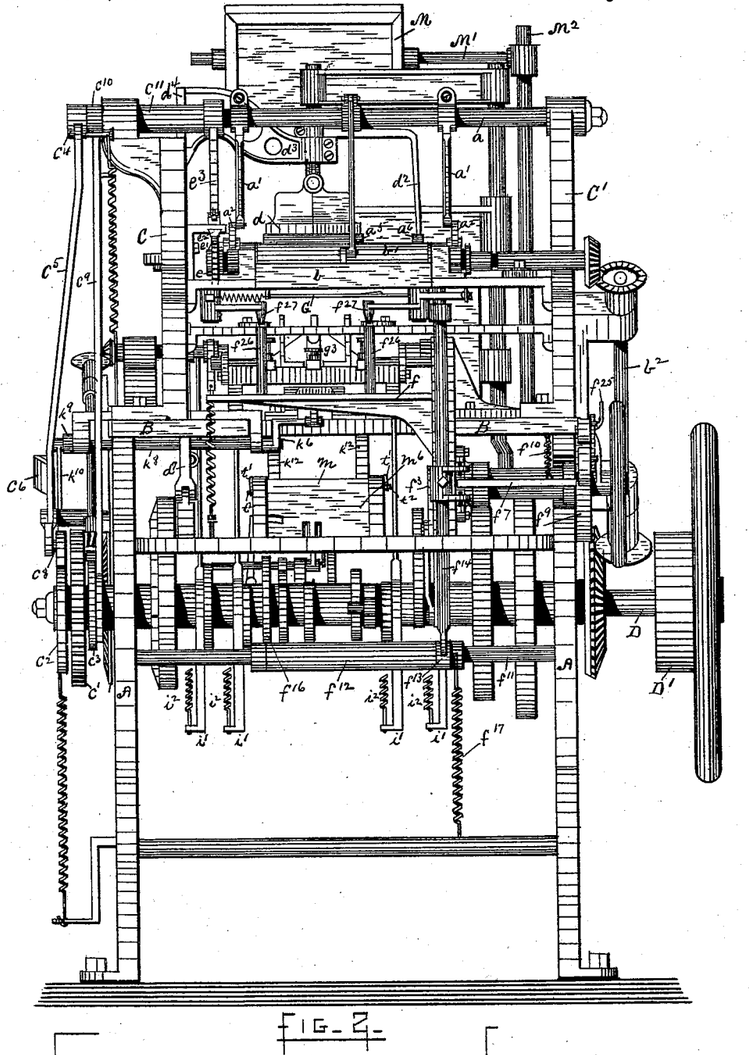
Fig. 2 is a front elevation.
Figure 4:
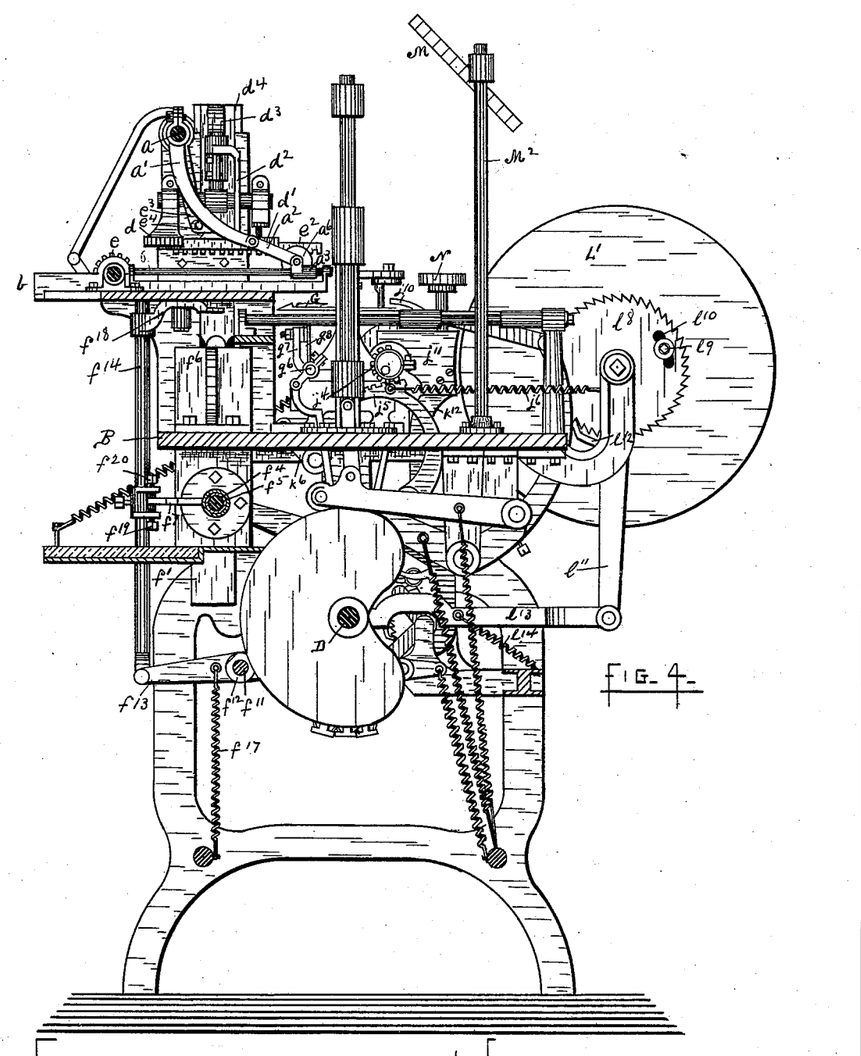
Fig. 4 is a sectional view, the side frame of the machine opposite that shown in Fig. 1 having been removed.

The blanks are placed upon the horizontal feeding-table $f$, attached to a vertical slide $f'$, Fig. 7, whose lower end is connected by a link $f^2$ with a crank $f^3$ on the end of a short horizontal shaft $f^4$, having a bearing in a sleeve $f^5$ attached by a flange to a stand $f^6$, Fig. 4, which is secured to the table B, Fig. 2. Pivoted on the sleeve $f^5$ is a frame $f^7$, carrying a pawl $f^8$ engaging a ratchet-wheel $f^9$ on the outer end of the horizontal shaft $f^4$. The weight of the frame $f^7$ and its pawl is sustained by the tension of the spring $f^{10}$, Fig. 2, upon a rod $f^{11}$. Held by the frame A is a sleeve $f^{12}$ with an arm $f^{13}$, Figs. 2 and 4, to which is pivoted a vertical rod $f^{14}$, sliding in bearings in the shelf or table sustaining the gum-box $b$. At the opposite end of the sleeve $f^{12}$ is an arm $f^{15}$, Fig. 5, carrying a cam-ball, held in contact by a spring $f^{17}$ on arm $f^{13}$ with a cam $f^{16}$, Fig. 2, by which the sleeve $f^{12}$ is oscillated at each revolution of the main shaft and a reciprocating motion given to the vertical rod $f^{14}$. A finger $f^{18}$ attached to the rod $f^{14}$ extends over the pile of blanks on the table $f$, and a collar midway the rod carries, in projecting lugs, the adjusting-screws $f^{19}$ and $f^{20}$. A hand-wheel $f^{21}$ is placed on the end of the horizontal shaft $f^4$. A retaining-pawl $f^{22}$ is pivoted to the frame A, and between the ratchet-wheel and hand-wheel we pivot on the horizontal shaft an arm $f^{23}$, Fig. 8, carrying an arc-shaped cam-plate $f^{24}$, having a projecting spur or handle $f^{25}$, which may be brought toward the front of the machine, carrying the inclined surfaces of the cam-plate $f^{24}$ beneath projecting pins on the pawls $f^8$ and $f^{22}$, thereby disengaging both pawls simultaneously from the ratchet-wheel and allowing its motion to be reversed.

The operation of feeding is carried on as follows: A pile of blanks is placed on the horizontal table $f$ and brought up against the finger or "feeler" $f^{18}$, and in position to be struck by the downward motion of the pick-ups. As the blanks are successively gummed and carried to the folding mechanism the rod $f^{14}$ is permitted by the finger $f^{18}$ to bring the screw $f^{20}$ against the frame $f^7$ and cause the pawl $f^8$ to engage the next succeeding tooth on the ratchet-wheel, and at the next upward motion of the rod $f^{14}$ the screw $f^{19}$ carries the frame and pawl upward, rotating the ratchet-wheel and crank $f^3$ and carrying the feeding-table $f$ upward by one tooth of the ratchet. The upward motion of the rod $f^{14}$ is positive; but its downward motion is produced by the spring $f^{17}$ and is limited by the feeler $f^{18}$ resting on the pile of blanks. The motion of the crank $f^3$ is from its lowest dead-center to its highest, when any further rotation of the ratchet-wheel will carry the crank past its upper dead-center and its forward motion will be continued by its own weight and that of the table $f$, causing it to fall and the crank to assume the position shown in Figs. 2 and 7, with the table $f$ at its lowest point, in position to be again filled with blanks and the operation of feeding resumed.

Figure 6:
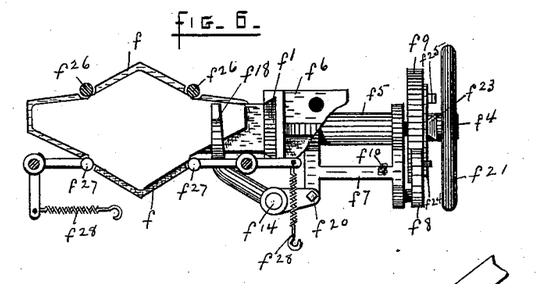
Fig. 6 is a top view of the mechanism for feeding the blanks to the gumming mechanism or pick-ups.

The pile of blanks is maintained in suitable position on the table by the guide-rods $f^{26}$, Fig. 6, against which the blanks are held by tapered gages $f^{27}$, Figs. 2 and 6, on arms pivoted to the framework of the machine and pressed against the blanks by springs $f^{28}$. The envelope-blanks as they are raised from the pile by adhesion to the gummers or pick-ups are separated from the pick-ups by being brought in contact with the under side of the shelf supporting the gum-box as the pick-ups pass through the shelf in their upward motion, and each blank so raised is seized by the projecting spurs or hooks of the reciprocating carriage G, which passes beneath the elevated blank and on its return motion carries it over the folding-bed $g$ and beneath the plunger $g'$, whose downward motion brings the blank in position to be folded by the action of the hinged folders, the end flaps by the folders $g^2 g^3$, the back flap by the folder $g^8$, and the seal-flap by the lip or rib $g^4$. The horns $g^5$ on the folders $g^2$ prevent the seal-flap from coming in contact with and adhering to the envelope.

We accomplish the complete and perfect contact of the gummed surface of the back flap, without reference to the thickness of the paper, by means of a back-flap folder. (Illustrated in detail in Figs. 12 and 13.) The spindle $g^6$, journaled in bearings at each end, forms the pintle of the folder, which is composed of an arm $g^7$ attached to the pintle and a plate $g^8$ adapted to apply a pressure to the surface of the back flap to properly fold the edge and insure the union of its gummed surface with the envelope. The lower edge of the plate $g^8$ is inserted in the pintle and rests against a shoulder or lip $g^9$, while the plate itself is held by a screw-bolt $g^{10}$ and nuts $g^{11}$ firmly against an elastic washer $g^{12}$, interposed between the plate $g^8$ and the flange $g^{14}$ of the sleeve $g^{13}$.

The arm $g^7$ carries a sleeve $g^{13}$, concentrically inclosing the bolt $g^{10}$ and having a screw-threaded connection with the arm $g^7$. The sleeve $g^{13}$ is provided with a flange $g^{14}$, which rests against the elastic washer $g^{12}$ and is provided with holes $g^{15}$ to allow a lever or spanner to be used in turning the sleeve $g^{13}$ in the arm $g^7$. Whenever it is desired to increase the tension of the elastic washer $g^{12}$ the nuts $g^{11}$ are screwed up against the end of the sleeve $g^{13}$, compressing the elastic washer $g^{12}$ between the folding-plate $g^8$ and the flange $g^{14}$ of the screw-threaded sleeve.

When the nuts $g^{11}$ are screwed against the end of the sleeve, in order to compress the elastic washer and increase its tension, space between the vibrating arm $g^7$ and the folding-plate $g^8$ will be decreased corresponding to the compression of the elastic washer, and in order to maintain the space between the arm $g^7$ and folding-plate $g^8$ the screw-threaded sleeve $g^{13}$ is turned in the arm $g^7$ and carried toward the plate $g^8$, thereby carrying the bolt $g^{10}$ and moving the folding-plate away from the arm $g^7$ a distance equal to the compression of the elastic washer by the tightening of the nuts $g^{11}$, and thereby preserving the proper parallelism of the folding-plate $g^8$ with the folding-bed $g$.

By inserting the edge of the plate $g^8$ below the concentric surface of the pintle and holding it against a shoulder $g^9$ we secure a close joint as presented to the edge of the envelope in forming the folded edge, and at the same time allow the plate $g^8$ to recede to accommodate itself to paper of different thicknesses.

As the folding-plate is brought down upon the bed $g$ the pressure upon the interposed envelope will vary with any change in the tension of the elastic washer $g^{12}$. The washer $g^{12}$ not only regulates the amount of pressure exerted by the folding-plate, but it also serves to equalize the pressure, for an increase in the pressure on one side of the plate will cause a yielding of the washer on that side of the plate $g^8$ and vary its plane about the washer as a fulcrum. The mechanism for actuating the folding-flaps forms no part of our present invention, and is not therefore shown in detail in the drawings. Crank-arms $i$, Fig. 5, are attached to the pintles of the folders with connected rods $i'$, which are drawn down by cams on the main shaft, raising the folders, and are carried up by springs, (partly shown at $i^2$, Figs. 2 and 5.)

Figures 14, 15, 16, 17, 18, 19, 20, 21:
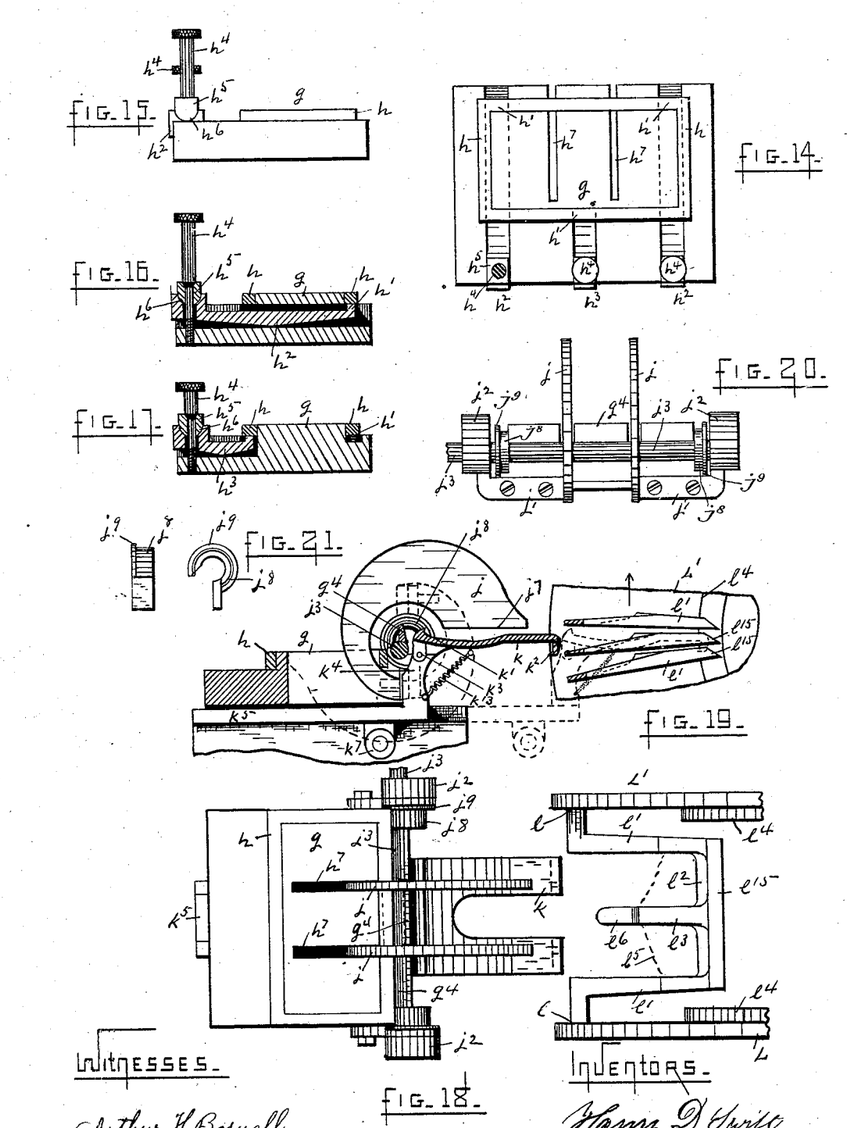
Fig. 14 is a top view of the bed on which the envelopes are folded.
Fig. 15 is a side view of the same.
Figs. 16 and 17 are sectional views of the same.
Figs. 18 and 19 are top and side views of the mechanism directly employed in delivering the envelope from the folding to the drying mechanism.
Figs. 20 and 21 show detached portions of the same.

The folding-bed $g$ consists of a central solid portion surrounded by a rectangular frame $h$, supported at the three points $h'$ and vertically adjustable, so its upper surface will be held even with the central bed $g$, or dropped below to relieve the edges of the envelope from pressure. The vertical adjustment of the frame $h$ is made by the three levers $h^2$, $h^2$, and $h^3$, similar in construction and identical in operation. The frame $h$ is supported on the ends of these levers, which are fulcrumed midway their length and have their opposite ends depressed to raise the frame by means of the screws $h^4$, which enter the bed beneath the levers and bear upon chairs $h^5$, whose convex surfaces $h^6$ are seated in the levers to accommodate their rocking motion.

Figure 27:
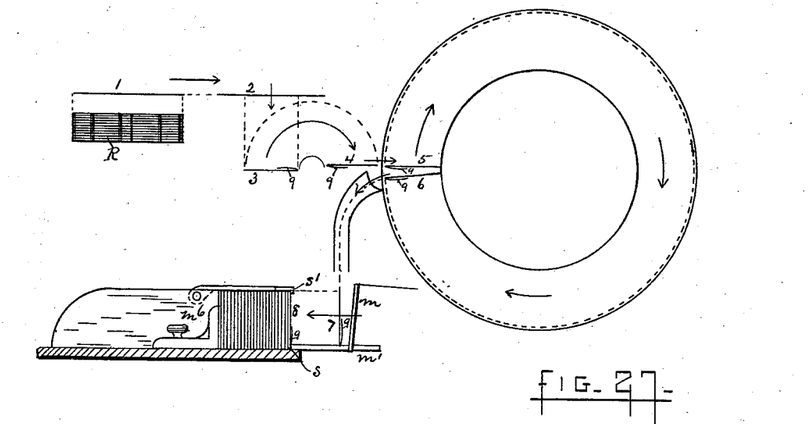
Fig. 27 is a diagrammatic view illustrating the method of presenting the envelope to the successive operations of the machine.

The mechanism employed in transferring the envelope from the folding-bed $g$ to the drier is shown in Figs. 4 and 5 and in detail in Figs. 18 to 21, while the operation itself is illustrated in the diagram forming Fig. 27. Two scroll-shaped wings $j$ are attached by bars $j'$ with rings $j^2$, which turn on bearings at each side of the folding-bed and which are eccentric to the pintle $j^3$ of the seal-flap folder $g^4$. To one of the rings $j^2$ we attach a gear $j^4$, Fig. 4, meshing with the geared vibrating sector $j^5$, which is actuated by a cam on the main shaft and the springs $j^6$, Fig. 4, producing a vibrating motion of the geared sector and a corresponding motion of the scroll $j$, timed to accord with the operation of the folding mechanism. During the operation of folding the scroll $j$ assumes the position shown by broken lines in Fig. 19, the wings of the scroll passing down through the slots $h^7$, Figs. 14 and 18, and bringing the straight edges $j^7$ just below the surface of the folding-bed. Upon the completion of the folding the scroll moves to the position shown in Fig. 19, raising the envelope from the folding-bed and carrying it over upon the conveyer $k$, the seal-flap edge of the envelope resting during its passage upon the flanges $j^8$, which, for convenience of construction, we make hook-shaped, as shown by the two views in Fig. 21, the vertical flanges $j^9$, Fig. 21, preventing any movement of the envelope endwise. Guards $j^{10}$, Fig. 5, are also used, curved concentrically with the motion of the envelope and attached to the side plates $j^{11}$, Fig. 5, which prevent the lateral displacement of the envelope as it is carried by the rings $j$ $j$, securing the exact delivery of the envelope upon the conveyer $k$.

It will be observed that the axis of rotation of the scroll, as also the center of curved flanges $j^8$, are placed above the plane of the folding-bed, so as to cause the envelope to be raised as it passes to the conveyer $k$. We not only effect the complete delivery of the envelopes from the folding-bed by the single action of the scroll $j$, but we turn the envelopes, which we have brought to the folding mechanism with their seal-flaps foremost, so as to present them to the drier with the back flap foremost and with the folded side of the envelope downward, as illustrated in Fig. 27.

The conveyer $k$ consists of a plate slightly curved in a portion of its surface to form a depression for the seal-flap, having its rear edge hooked at $k'$ to strike against the edge of the envelope as it is carried to the drier and its forward end hooked at $k^2$ to withdraw an envelope from the drier on its return movement.

The plate $k$ we hinge at $k^3$ to a stand $k^4$ projecting upward from a slide $k^5$ sliding in ways beneath the folding-bed and actuated by a crank $k^6$, Figs. 2 and 4, connected with the lug $k^7$, Fig. 19. The crank $k^6$ is attached to a short shaft $k^8$, Figs. 1 and 2, passing beneath the bed B and having a crank $k^9$, Figs. 1 and 3, at its outer end. A connecting-rod $k^{10}$, Fig. 1, carrying a cam-roll, is actuated by the cam $k^{11}$, causing an oscillation of the crank-shaft $k^8$ and carrying the conveyer $k$ to the position in the drier indicated by broken lines, Fig. 19, the edges $j^7$ of the scroll serving as guides to hold the envelope in position on the conveyer and prevent its being raised by the curling of the freshly-gummed and undried seal-flap.

The drier is composed of two disks L L' having a series of equidistant racks arranged concentrically about the disks and attached to them at $l$. Each rack consists of the radial bars $l'$ connected at their inner ends by a central bar $l^2$, having a finger $l^3$ extending radially outward. The spaces between the racks form pockets for the envelopes, whose inner edges rest at each end on the internal flanges $l^4$. The backs of the envelopes rest against the lower or straight sides of the racks, Fig. 19, and the surface inclosed by the broken line $l^5$, Fig. 18, presses against the back flap. The curved surface $l^6$ of the central finger allows the seal-flap to stand away from the envelope and permit the free circulation of air over its gummed surface.

Figure 1:
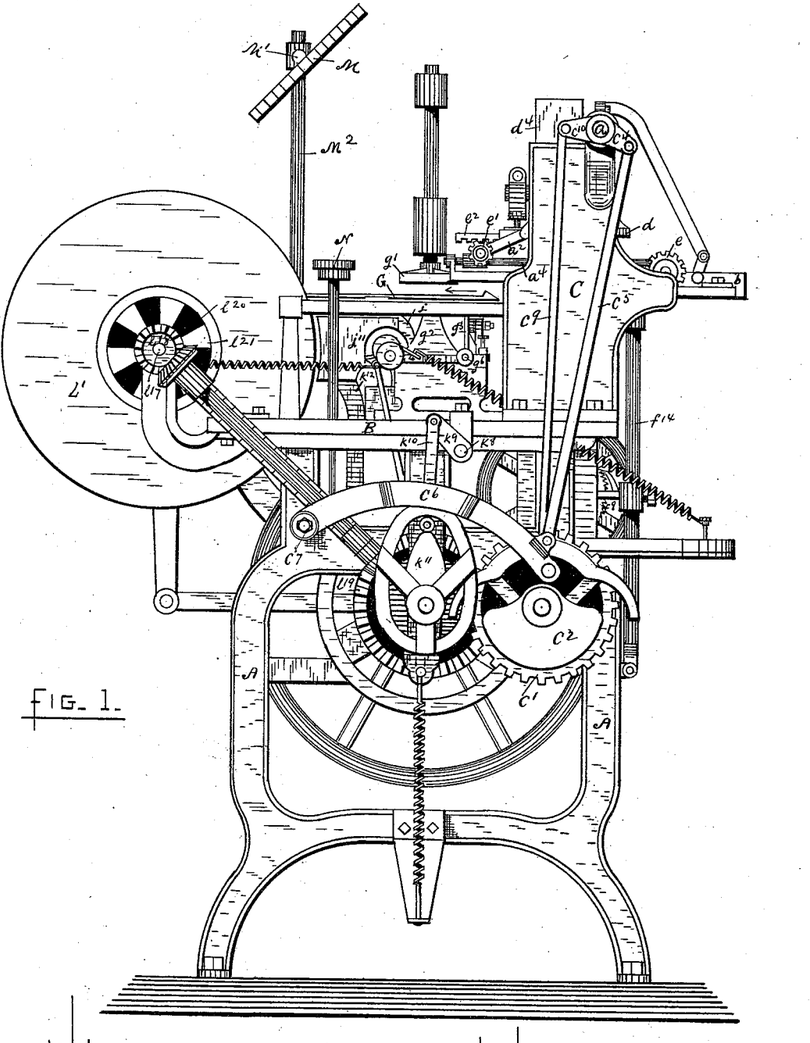
Figure 1 represents a side elevation of one of our improved machines.
Figure 3:
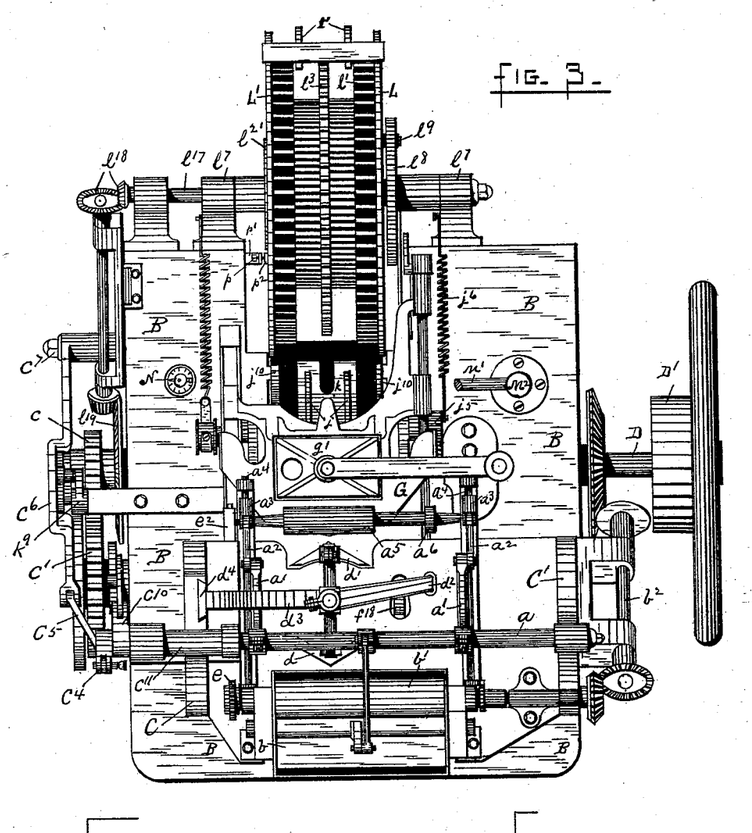
Fig. 3 is a top view with the mirror omitted.

The disks L L', connected by the racks, as described, rotate in bearings $l^7$, Fig. 3, at the rear of the machine. A ratchet-wheel $l^8$, turning on the central shaft of the drier, is attached to the disk L by a bolt $l^9$, passing through a slot $l^{10}$ in the ratchet, which permits the drier to be adjusted with reference to the ratchet-wheel, so as to bring the pockets in proper position to receive an envelope at the forward movement of the conveyer $k$. A lever $l^{11}$, pivoted concentrically with the ratchet-wheel and carrying the actuating-pawl $l^{12}$, is vibrated through a bar $l^{13}$ by a cam on the main shaft and the spring $l^{14}$. The action of the operating mechanism just described moves the drier in the direction of the arrow in Fig. 19 and causes the rack next below the newly-inserted envelope to lift it from the conveyer $k$, and at the same time to bring an envelope which has completed the circuit of the drier beneath the conveyer in position to be engaged by the hook $k^2$ and withdrawn into the curved chute $k^{12}$ leading to the bunching and counting mechanism. The inner sides of the cross-bars $l^2$ in the racks are beveled to an edge, as at $l^{15}$, Fig. 19, to readily admit the circulation of air from the central portion of the drier outward through the envelope-pockets. This current of air is carried in our machine radially outward beneath the seal-flaps instead of across the envelopes from end to end, as has been heretofore done, and we generate a current of air in our present machine by a revolving fan $l^{16}$ on a shaft $l^{17}$, Fig. 3, held in bearings concentric with the drier and driven through the intermediate gearing $l^{18}$, as shown in Figs. 1 and 3, by a bevel-gear $l^{19}$ on the main shaft; but a current of air may be taken in at the center by a conduit from a fan or blower outside.

Figure 28:
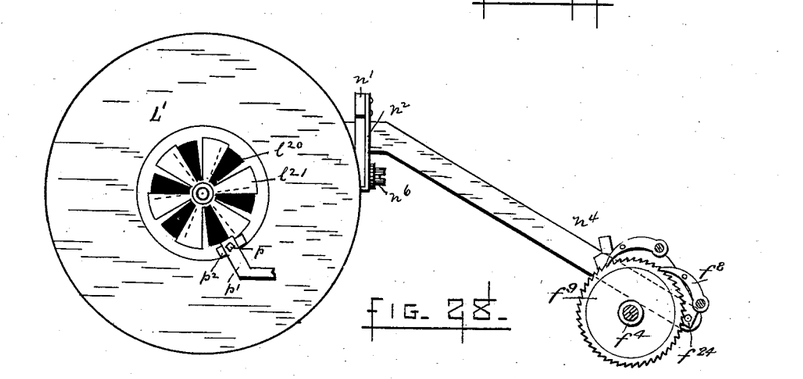
Fig. 28 is a side view of the drier, showing the method of regulating the current of air upon the envelopes and also showing the arrangement of the stop mechanism, which has been omitted from the other views to avoid confusion.

We receive air into the drier at the side, as shown in Fig. 28, and the several openings $l^{20}$ are partially or wholly closed by a rotating register $l^{21}$, regulating the amount of air forced through the pockets and thereby accelerating or retarding the process of drying.

As the conveyer $k$ is delivering an envelope to the drier and an envelope is being brought in position to be engaged by hook $k^2$ by the rotation of the drier the scroll is carried to the position indicated by broken lines in Fig. 19 and the operation of folding repeated, after which the synchronous movements of conveyer and scroll bring them to the position shown in Fig. 19, carrying the envelope onto the conveyer $k$.

Above the conveyer $k$ we place a mirror M, held by the horizontal arm M' and post $M^2$ and in position to enable the attendant at the front of the machine to watch the delivery of envelopes to the drier.

In order to enable the attendant to more easily remove waste when necessary, the conveyer is hinged at $k^3$ to the stand $k^4$ and maintained in its normal position, when in operation, by a spring $k^{13}$.

The envelopes as conveyed from the drier by the chute $k^{12}$ fall in front of the pusher, with their seal-flap edges resting on the ways $m'$ and with their folded side next the pusher, which is composed of a plate $m$ at the end of a pivoted lever $m^2$, oscillated on the center $m^3$ by a cam $m^4$ and a spring $m^5$, Fig. 5.

Figures 23, 24, 25, 26:
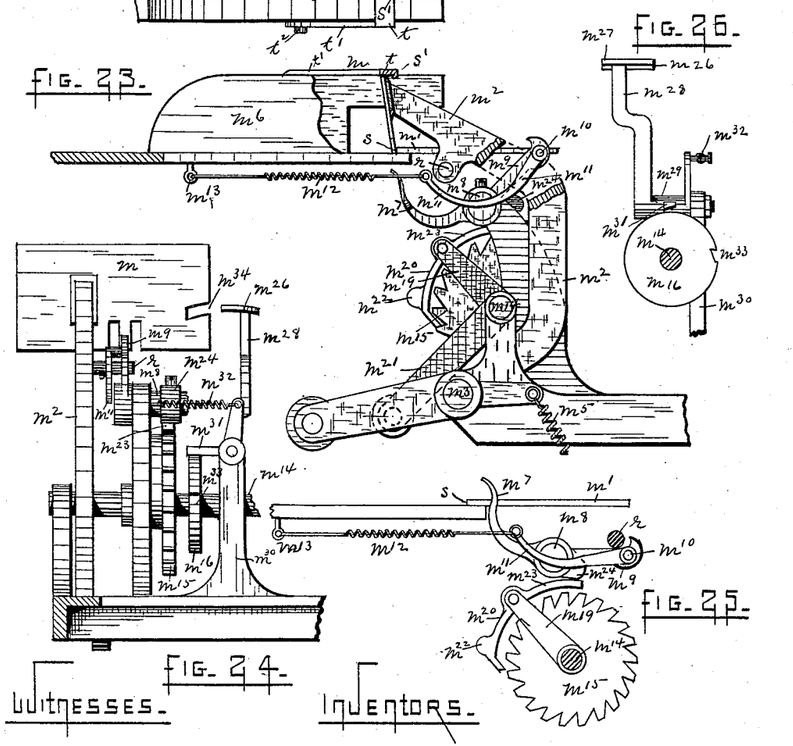
Fig. 24 shows a rear view of a portion of the counting mechanism.
Figs. 25 and 26 show detached portions of the counting mechanism.

The envelope is carried by the forward motion of the pusher off the ways $m'$ into the till $m^6$ past the lips $s$ $s'$, which prevent the return of the envelope, and brought in contact with the curved and forked tripping-finger $m^7$, Fig. 25, attached to a rocking shaft $m^8$ and having a radial arm $m^9$, at whose outer end $m^{10}$ the curved bar $m^{11}$ is pivoted. To the free end of the bar $m^{11}$ we apply the drawing tension of the spring $m^{12}$, attached at $m^{13}$ to a rigid portion of the machine. The forward movement of the envelope, pressing against the curved tips of the finger $m^7$, rocks the shaft $m^8$ and elevates the outer end of the radial arm $m^9$, bringing the line of draft, as exerted by the spring $m^{12}$, between the points $m^{10}$ and $m^{13}$ and above the axis of the shaft $m^8$, when the tension of the spring $m^{12}$ will throw the finger $m^7$ downward, in the position shown in Fig. 23, out of the path of the envelope, and as the tips of the finger $m^7$ move in a curved line they are instantly withdrawn from contact with the envelope, which prevents the indentation or abrasion of the surface of the envelope, which is liable to be produced when the counting-finger or equivalent device is moved on the surface of the envelope. When the finger $m^7$ is in the position shown in Fig 25 the line of draft between the points $m^{10}$ and $m^{13}$ should pass through the axis of the finger $m^7$, so that a very slight movement of the finger by the moving envelope will cause the spring to instantly trip the finger $m^7$.

Journaled in bearings beneath the rocking shaft $m^8$ is a shaft $m^{14}$, carrying a ratchet-wheel $m^{15}$, a plate-wheel $m^{16}$, having a notch $m^{33}$, and a worm $m^{18}$. Pivoted on the shaft $m^{14}$ is a bell-crank lever, the arm $m^{19}$, carrying a pawl $m^{20}$, pivoted on the arm, and the long arm $m^{21}$, carrying a cam-roll, which is held in contact with a cam on the main shaft by a spring applied to the arm $m^{21}$ and not shown. This actuating-cam is designed to impart an oscillating motion to the bell-crank lever and pawl $m^{20}$ at each revolution of the main shaft moving the ratchet-wheel by one tooth. The pawl is weighted at $m^{22}$ to cause it to engage the teeth of the ratchet-wheel.

The pawl $m^{20}$ has an arm $m^{23}$ extending beneath the rocking shaft, Fig. 25, to which a cam-shaped arm $m^{24}$ is attached in position to bear upon the pawl-arm $m^{23}$ and disengage the pawl from the ratchet, as shown in Fig. 25.

The pusher-plate $m$ is notched to allow it to pass the finger $m^7$ without tripping when no envelope is present; but in case an envelope is carried forward by the pusher its contact with the finger will move it a short distance, raising the arm $m^9$ and causing the spring $m^{12}$ to instantly trip the finger and rock the shaft $m^8$, thereby raising the cam-shaped arm $m^{24}$ and allowing the weighted end of the pawl to engage the ratchet-wheel and move it one tooth by the oscillation of the bell-crank lever, as described, which is timed to follow each forward movement of the pusher.

A pin $r$ extending laterally from the pusher-lever over the finger $m^7$ strikes the radial arm $m^9$ on its backward motion whenever the finger has been tripped, depressing it and raising the finger $m^7$ again in position to be moved by the next succeeding envelope.

The ratchet-wheel $m^{15}$ is divided into twenty-five teeth, so that the passage of twenty-five envelopes will cause the entire rotation of the ratchet $m^{15}$ and shaft $m^{14}$. The worm $m^{18}$ engages a gear $m^{25}$ on a vertical spindle which extends up through a hollow stand or post on the table B, supporting a graduated and numbered dial N, Fig. 3, and an index-finger on the vertical spindle indicates the total number of envelopes made by the machine. As the ratchet-wheel $m^{15}$ completes a revolution an envelope is moved endwise beyond the others as it is carried into the till, marking off the envelopes into bunches of twenty-five each, by means of a plate $m^{26}$, with an edge $m^{27}$ standing obliquely to the line of motion of the envelopes as they move into the till. This plate is mounted upon a bent arm $m^{28}$, attached to a sleeve $m^{29}$, which rotates on a stud held in the stand $m^{30}$. An arm $m^{31}$ extends horizontally from the sleeve $m^{29}$ and rests on the periphery of the plate-wheel $m^{16}$. An arm attached to sleeve $m^{29}$ extends upward with a spring $m^{32}$, attached to a rigid portion of the machine, and whose tension holds the horizontal arm $m^{31}$ firmly pressed upon the edge of the plate-wheel $m^{16}$.

At each revolution of the plate-wheel a notch $m^{33}$ is brought beneath the horizontal arm $m^{31}$, permitting the spring $m^{32}$ to rock the sleeve $m^{29}$ on its stud and carry the plate $m^{26}$ forward into the path of the envelopes as they are carried forward into the till, the end of the envelope coming in contact with the oblique edge $m^{27}$, which moves the envelope laterally as it rests on its edge upon the ways $m'$. An opening $m^{34}$ in the plate $m$ of the pusher allows it to pass the plate $m^{26}$. The next movement of the plate-wheel $m^{16}$ raises the horizontal arm $m^{31}$ and removes the plate $m^{26}$ out of the path of the envelopes. By this method of moving the envelope a very small pressure applied against the end is sufficient to overcome the slight resistance of the envelope moving endwise and resting on its edge, with but its own weight to sustain.

We have not considered it necessary in the above description of the several operations of our improved machine to show and particularly describe the several actuating-cams, as it would only involve details of construction, and, with the motions of the operating parts of the machine given, the formation and arrangement of the requisite cams to produce these motions will be readily understood by any one skilled in the art of constructing envelope-machines.

The objective result of that part of our invention which relates to the arrangement and combination of the several mechanisms concerned in the production of an envelope is illustrated in Fig. 27, which shows the several positions of the envelope during the successive operations of gumming, folding, drying, and bunching.

The blanks R are presented to the gummer, as at 1, Fig. 27, with their seal-flaps foremost, as the seal-flaps receive the largest amount of gum, and therefore the lifting of the forward edge of the blank is better assured, permitting the carriage to pass beneath it and carry it to position 2. When folded the seal-flap 9 occupies the position seen at 3, Fig. 27, and by the action of the delivery mechanism it passes, as indicated by the curved lines, to position 4, with the seal-flap downward and rearward; thence to position 5 in the drier, and by the rotation of the drier to position 6. Then it is withdrawn from the drier and falls by its own weight through a curved chute to position 7, with the seal-flap downward, the folded side of the envelope being brought next the pusher.

The seal-flap when freshly gummed has a tendency to curl outward, owing to the expansion of the gummed surface, and when dried it has a tendency to curl inward for the opposite reason. This tendency of the seal-flap to curl, together with its semi-detached relation to the envolpe, renders the position of the envelope during the several operations, as shown in Fig. 27, advantageous to the perfect and rapid manufacture.

We do not claim to be the first who have ever caused the envelope to be presented to the operations of a machine in any of the positions shown in Fig. 27, for they have individually been secured in other machines; but our present machine, so far as we know, is the first to secure the advantages of all these positions of the envelope in the same machine, and we accomplish it by turning the envelope between the folding and drying mechanism and then rotating the drier, so as to carry the envelopes upward instead of downward.

Figures 29, 30:
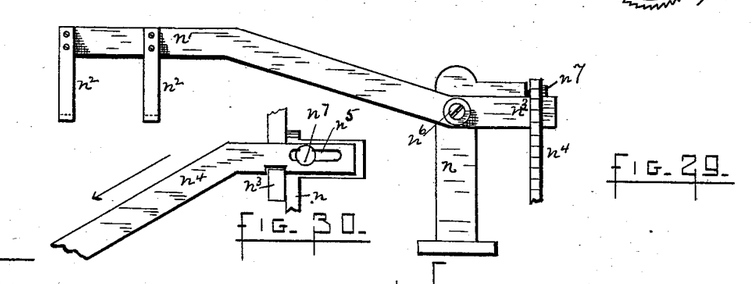
Figs. 29 and 30 show detached portions of the stopping mechanism.

Our mechanism for stopping the supply of blanks to the machine upon the imperfect or incomplete delivery of envelopes to the drier is shown in detail in Figs. 28, 29, and 30, but is omitted from the views of the machine, as its application will be readily understood.

To a stand $n$, which is secured to the top of the table B, we pivot a lever whose long arm $n$ extends above and in front of the rotating drier. From this arm fingers $n^2$ extend downward in position to be struck by any envelope which projects beyond the racks as the drier rotates. The short arm $n^3$ of the lever engages a notch in a bar $n^4$ and serves as a latch to hold it in position. The bar $n^4$ has a slot $n^5$ at its upper end, inclosing a pin in the stand $n$, while its lower end is pivoted at $f^{29}$, Fig. 8, to the cam-plate $f^{24}$, by which the pawls of the feeding ratchet-wheel $f^9$ are disengaged.

In case an envelope has not been completely carried into the drier it will be brought against the fingers $n^2$, lifting them and depressing the short arm $n^3$ of the lever and unlatching the bar $n^4$, which slides down in the direction of the arrow, Fig. 30, rotating the cam-plate $f^{24}$ and disengaging the pawls, when the feeding-table $f$, suspended on the crank $f^3$, falls and withdraws the supply of blanks.

We do not confine ourselves to any specific construction of connecting mechanism with the feed-pawls or other parts of the machine, the essential feature of our invention consisting of a body interposed in the path of an envelope projecting from the drier. In order to retain the envelopes in the drier as they pass beneath it, an inclosing shell or case or one or more curved bars, as at P, Fig. 3, may be used.

In order to check the rotation of the drier, we employ a brake applied to the side of one or both of the disks (illustrated in Fig. 28) and consisting of an adjusting-screw $p$, held in a rigid arm $p'$ attached to the framework of the machine, and between the end of the screw and the side of the disk we interpose an elastic washer or curved spring-plate $p^2$.

The tripping-finger vibrates between the positions shown in Figs. 23 and 25, its lowest position being represented in the former and its highest in the latter figure, and the vibratory motion of the finger can be limited by any of the well-known form of "stops," by which the angular motion of the carrying-shaft $m^8$ may be limited. We have not therefore deemed it necessary to illustrate any particular form of such limiting device.

We do not confine ourselves to the specific form of spring $m^{12}$ employed for tripping the finger $m^7$, as a blade-spring could be applied to a V-shaped projection on the rocking shaft $m^8$ in a manner well known to mechanics.

Figure 22:
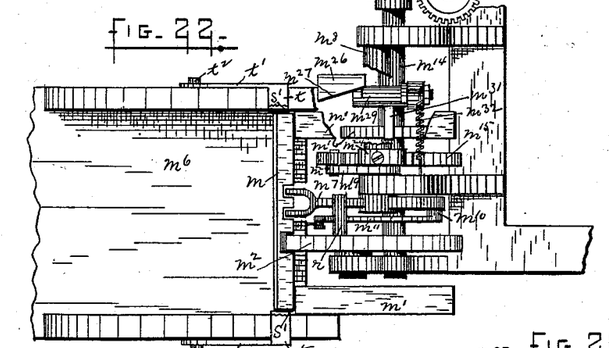
Figs. 22 and 23 are top and side views of the counting mechanism.

The ways $m'$ form lips or offsets at $s$, which hold the envelopes in the bunch as the pusher moves back. The upper edges of the envelopes are similarly retained in the bunch in our machine by a lip $s'$ on the bar $t$, (shown in Figs. 22 and 23,) with its central portion removed and attached to the levers $t'$, hinged at $t^2$ to the sides of the till, permitting the lipped bar $t$ to be raised when required.

What we claim as our invention, and desire to secure by Letters Patent, is—

1. The combination with a feeding table of a shaft, a ratchet wheel attached to said shaft, actuating and retaining pawls engaging said ratchet wheel and a crank arm attached to one end of said shaft and operatively connected with said table to bring said table to its highest position when said crank arm is at its highest dead center, said crank arm being capable of a complete revolution, whereby said arm, when at its highest position, will lower the table by its continued forward movement, substantially as described.

2. The combination with the feeding table, of a shaft operatively connected with said table, a ratchet wheel attached to said shaft, actuating and retaining pawls engaging said ratchet wheel, a pivoted frame carrying said actuating pawl, and a spring applied to sustain the weight of said frame, substantially as described.

3. The combination with the feeding table, of a shaft operatively connected with said table, a ratchet wheel attached to said shaft, an actuating pawl engaging said ratchet wheel, a reciprocating rod having lugs attached thereto, arranged to engage and operate said actuating pawl, and adjusting screws held in said lugs, substantially as described.

4. The combination with the feeding table, of a shaft operatively connected with said table, a ratchet wheel on said shaft, an actuating pawl engaging said ratchet wheel, a reciprocating rod having projecting lugs arranged to move said pawl, and a finger attached to said rod and extending over and resting upon the pile of blanks held on said feeding table, whereby the downward motion of said rod is limited, and the extent of its reciprocating motion varied to correspond with the height of the pile of blanks, substantially as described.

5. The combination with the feeding table, of the mechanism for elevating the same and consisting of a shaft $f^4$, a ratchet wheel $f^9$, retaining pawl $f^{22}$, frame $f^9$, actuating pawl $f^8$ having connected mechanism by which they are operated to produce an intermittent rotary motion of said shaft, and a crank arm attached to the end of said shaft and operatively connected with said table to bring it into its highest position when said crank arm is on its highest dead center, whereby said table is lowered by the continued forward motion of said crank arm, substantially as described.

6. The combination with the feeding table of an envelope machine, for presenting a pile of blanks to the action of the gumming mechanism, and guides at one side of the pile of blanks, against which they are held in proper position to receive the gum, of tapered gages $f^{27}$, on arms pivoted to the rigid portions of the machine, and springs $f^{28}$ applied to press the tapered gages against the pile of blanks and hold it against the guides, as described.

7. The combination with the devices for placing gum upon the blanks in an envelope machine, and a gumming roll having a reciprocating motion to and from a gum supply over said gumming devices and having a gear wheel attached to its shaft, of a rack lying in the path of, and in mesh with, said gear wheel, said rack having a longitudinal sliding motion, through connected operating mechanism, so timed with reference to the passage of the gumming roll over the surfaces of said gumming devices, as to vary the surface of the gumming roll in contact with said gumming devices.

8. The combination with pick-ups, having a vertically reciprocating motion, carrying gum to the blanks in an envelope machine, of a gum box placed at one side of said pick-ups, and a gumming roll with a horizontally reciprocating motion to and from said gum box over the gumming surfaces of said pick-ups, said gumming roll moving in one direction only at each complete reciprocation of the pick-ups, and having connected operating mechanism substantially as described at the end of its outward movement, whereby it is rotated on its axis, so as to present a new surface to the pick-ups during its return, or inward, movement.

9. The combination of a rocking shaft $a$, provided with radial arms $a'$, a gumming roll $a^5$, links $a^2$ connecting said roll and said radial arms, a rocking sleeve $c^{11}$ held concentrically on said shaft $a$ and having a radial arm $e^3$, a sliding rack $e^2$, connected with said radial arm $e^3$ and a gear $c'$ on the shaft of said gumming roll, whereby the action of said rock-shaft $a$, and concentric sleeve $c^{11}$ will produce a conjoint motion of said rack and said gumming roll, substantially as described.

10. The combination with a feeding table, upon which the pile of blanks is supported, of a vertically reciprocating slide $d^4$ provided with an overhanging arm carrying the pick-ups, a lever $d^5$ and a yielding connection between said lever and said slide, consisting of a link $d^7$ connected with said lever, a rod $d^8$ connected with said slide and capable of sliding within said link and a spring $d^9$ interposed between said rod and said link, substantially as described.

11. The combination with the folding bed of an envelope machine of a folder for folding the back-flaps, said folder consisting of a rocking shaft journaled at one side of the folding bed with a channel or groove forming a lip extending the length of said folding bed, and an arm attached to said shaft, and a folding plate connected with said arm and adapted to press upon the back-flap, said folding plate having its edge resting in the groove of the shaft and against the lip, as described.

12. In the folding mechanism of an envelope machine, the combination of a vibrating arm, a folder plate connected with said vibrating arm, a screw threaded sleeve carried in said vibrating arm and provided with a flanged end opposing said folding plate and an elastic washer interposed between said folding plate and the flanged end of said screw threaded sleeve, substantially as described.

13. The combination in the folder for folding the back-flap of an envelope, of a vibrating arm, a folder plate connected with said arm by a bolt, an elastic washer resting against the surface of said plate through which the force is applied from said arm to said plate, and a screw threaded sleeve held in said arm and inclosing the connecting bolt and with its end resting against the elastic washer, whereby the space between said vibrating arm and said folding plate is varied, as described.

14. The combination in a folder for folding the back-flap of an envelope, of a vibrating arm, a folder plate connected to said arm by a screw threaded bolt, a screw threaded sleeve held in said arm, an elastic washer interposed between said folding plate and said screw threaded sleeve and an adjusting nut carried by said screw threaded bolt and bearing against the opposite end of said screw threaded sleeve, substantially as described.

15. In a folder for folding the back-flap of an envelope, of a vibrating arm attached to a rocking rod or spindle, whose axis lies in the horizontal plane of the folding bed, said rod having a channel or groove extending the length of the folding bed, a folding plate whose edge rests in said channel, said plate being operatively connected with said vibrating arm with the edge of the folding plate bearing against the side of said channel, substantially as described.

16. In the folding bed of an envelope machine, consisting of a central section, and a vertically adjustable rectangular frame surrounding said central section, the combination with said adjustable portion, of a series of levers with one end of each lever supporting said adjustable portion, and having means connected with their opposite ends whereby they may be depressed and the adjustable portion of the bed raised, as described.

17. The combination with the folding bed of an envelope machine, consisting of a central section, and a surrounding rectangular portion vertically adjustable with reference to said central section, of levers whose free ends support the adjustable portion of the bed, and screws $h^4$ passing through the opposite ends of said levers, whereby they are depressed and the adjustable portion of the bed raised, as described.

18. The combination with the folding bed of an envelope machine, consisting of a central section, and a surrounding rectangular section vertically adjustable with reference to said central section, of levers $h^2$, $h^2$, and $h^3$, fulcrumed midway their length, and supporting said adjustable section on their free ends, screws $h^4$, and chairs $h^5$, as described.

19. The combination with the folding bed of an envelope machine, of the scroll shaped wings $j$, attached to rings $j^2$, rotating on bearings with their axis of rotation above the surface of the folding bed, as described.

20. The combination with the folding bed of an envelope machine, and vibrating wings lying in openings in the folding bed and journaled at the side of the bed and actuated through connected operating mechanism, of the curved flanges, or ways, $j^8$, to support the edge of the envelope, as it is carried above and around the axis of rotation of the vibrating arms, as described.

21. The combination with the folding bed of an envelope machine, and mechanism for raising and carrying the envelope off the folding bed, of flanges, or guides, $j^8$, and vertical flanges $j^9$, as described.

22. The combination with vibrating wings for delivering the envelopes from the folding table, said wings raising and carrying the envelopes in a circular path, substantially as described, of the curved guards $j^{10}$, to resist the centrifugal motion of the envelopes.

23. The combination with the drier, and the reciprocating wings $j, j$, and a reciprocating conveyer $k$ of the side plates $j^{11}$ forming guides whereby the envelope is held from lateral displacement as it is delivered to said conveyer, substantially as described.

24. The combination with mechanism for delivering the envelopes from the folding bed, consisting of the vibrating wings $j$, journaled with their axis of rotation raised above the surface of the folding table, and having a rotation of one half of a revolution, of a conveyer, consisting of a plate upon which the envelopes are laid by the vibrating wings $j$, said plate having a reciprocating motion, conveying the envelope to the drying mechanism, as described.

25. The combination with mechanism for raising the envelope from the folding table of an envelope machine with its seal flap uppermost as it is folded and turning the envelope so as to bring its seal flap downward and delivering the same to a conveyer by which it is carried to the drying mechanism, substantially as described, of a conveyer, consisting of a reciprocating plate operated through connected actuating mechanism, said plate having a projecting curved rib $k'$, as described.

26. The combination with mechanism for raising the envelope from the folding table and delivering the same to a conveyer, by which it is carried to the drying mechanism, of a conveyer, consisting of a plate reciprocated through connected operating mechanism, said plate having a depression to receive the seal-flap, as described.

27. The combination with the drier of an envelope machine, of a reciprocating conveyer plate $k$, provided upon its upper surface with a depression adapted to receive the seal flap and having a hook $k'$ by which the envelope is pushed into the drier and a hook $k^2$ upon its lower surface by which the envelope is withdrawn from the drier, substantially as described.

28. The combination with the drying mechanism of an envelope machine, of conveyer $k$, attached to the slide $k^5$, cranks $k^6$, and $k^9$, crank shaft $k^8$, connecting rod $k^{10}$, and actuating cam $k^{11}$, all operating as described.

29. The combination of a reciprocating conveyer for carrying envelopes from the folding to the drying mechanism, having connected means for operating the same, said conveyer consisting of plate $k$ having a depression in its surface to receive the seal flap of the envelope, and a rotating drier having fingers which lift the envelope from the conveyer, as described.

30. The combination with the drier, of a reciprocating conveyer plate $k$, provided with a depression in its upper surface to receive the seal flap of the envelope and having hooks $k'$ and $k^2$, by which an envelope is pushed into and withdrawn from the drier, and a chute arranged to receive the withdrawn envelope, substantially as described.

31. A rotating drier for envelope machines, consisting of a revolving drum, composed of two parallel disks, said disks having racks attached, forming a series of pockets around the periphery of the drum adapted to receive the envelopes and maintain them in a radial position.

32. A drier for envelope machines, consisting of a revolving drum having a series of pockets arranged around its periphery and adapted to hold the envelopes in a radial position, said pockets having openings to allow radial currents of air to pass from the center of the drum outward and over the surfaces of the envelopes held in said pockets, as described.

33. A drier for envelope machines, consisting of a revolving drum, composed of two parallel disks having racks attached and extending around their periphery and adapted to hold the envelopes in a radial position, said disks having concentric flanges on their inner surfaces on which the edges of the envelopes rest, as described.

34. A drier for envelope machines consisting of a revolving drum, having a series of racks arranged around its periphery adapted to maintain the envelopes in a radial position and admit the free circulation of air over their surfaces, and a central chamber containing a revolving fan, by which air is driven radially outward and over the envelopes held in said racks, as described.

35. The combination with a revolving drier for envelope machines, having connected means for forcing air from the center radially outward, of racks arranged around the periphery of the drier and adapted to hold envelopes in a radial position, said racks having their inner edges beveled and forming funnel shaped passages for the air, as described.

36. The combination with a drier for envelope machines, consisting of a revolving drum having pockets arranged around its periphery and a central revolving fan wheel, by which air currents are forced outward and over the surfaces of the envelopes held in said pockets, of a series of openings arranged concentrically about the axis of the revolving drum, and a rotating register $l^{21}$, by which the volume of air passing over the envelopes is varied, as described.

37. The combination with the revolving drier of an envelope machine, of an actuating ratchet wheel, having connected operating mechanism, said ratchet wheel having a slot, and a screw bolt passing through said slot into the drier, whereby the position of the drier may be changed relatively to said ratchet wheel, as described.

38. The combination of disks L, L', having flanges $l^4$, and racks forming pockets for envelopes, said racks consisting of bars $l'$ attached to the disks at $l$, cross bars $l^2$ connecting the inner ends of the bars $l'$, and central fingers $l^3$, as described.

39. The combination of disks L L', flanges $l^4$, racks composed of bars $l'$, attached to said disks, cross bars $l^2$, central fingers $l^3$, central fan $l^{16}$, openings $l^{20}$, and register $l^{21}$, as described.

40. The combination with the mechanism of an envelope machine for gumming and folding an envelope blank, whereby said blank is operated upon with its seal flap foremost, of the vibrating wings, substantially as described, by which the folded envelope is reversed so as to bring its back flap foremost as it is delivered to the drying mechanism.

41. The combination with ways upon which the envelopes are delivered from the drying mechanism, and a reciprocating pusher by which the envelopes are moved along said ways into bunches, as described, of a pivoted tripping finger, whose free end stands, in its normal position, in the path of the envelope as it is moved by the pusher, and a spring whose tension is applied to said pivoted finger in a line passing near its axis of rotation, so that a slight movement of the pivoted finger by the moving envelope will cause the force of said spring to be exerted on the opposite side of the axis of said finger, thereby tripping the finger and withdrawing it from the path of the envelope, as described.

42. The combination with the pusher $m$, attached to a pivoted lever $m^2$, having connected means for operating the same, pin $r$, pivoted finger $m^7$, having an arm $m^9$, and a spring $m^{12}$, whose tension is applied to the arm $m^9$, as described.

43. The combination with rocking shaft $m^8$, having a finger attached, actuated by the passage of an envelope into the till, arm $m^{24}$, on said rocking shaft, pawl $m^{20}$, having connected means for actuating the same, the arm $m^{24}$ acting on the tail of the pawl $m^{20}$ ratchet wheel $m^{15}$, connected with and operating the counting mechanism, as described.

44. The combination with mechanism for bunching the envelopes in an envelope machine, of a plate brought into the path of the envelopes at stated intervals, as determined by the passage of the envelopes into the bunch, said plate presenting an inclined surface to the edge of certain of the passing envelopes whereby they are carried out beyond the remaining envelopes, as described.

45. The combination with ways $m'$, on which the edges of the envelopes rest as they are carried into the bunch, pusher $m$, having a slot $m^{34}$, plate $m^{26}$, with an inclined edge $m^{27}$, said plate having connected actuating mechanism whereby it is brought into the path of certain of the envelopes as they are carried by the pusher over the ways $m'$, as described.

46. The combination with the counting mechanism of an envelope machine, of a plate wheel $m^{16}$, having a notch $m^{17}$, arm $m^{31}$, adapted to enter said notch, spring $m^{32}$ applied to hold said arm $m^{31}$ on the edge of the plate wheel, arm $m^{28}$, and plate $m^{26}$, having an inclined edge $m^{27}$, all arranged and operating as set forth.

47. The combination with the revolving drier of an envelope machine, adapted to carry a series of envelopes held in a radial position around its edge, of a finger, or fingers, having a motion about a pivoted point, and arranged in position to be struck, and moved by a projecting envelope, said fingers having connected stopping mechanism, as described.

48. The combination with the revolving drier of an envelope machine of fingers $n^2$, attached to the arm $n'$, of a pivoted lever whose arm $n^3$, engages a notch in the bar $n^4$, bar $n^4$, attached to the cam plate $f^{24}$, all arranged and operating substantially as described.

HENRY D. SWIFT.
D. WHEELER SWIFT.

Witnesses:
ARTHUR H. BOSWELL,
RUFUS B. FOWLER.